US008972554B2

(12) United States Patent
Lu

(10) Patent No.: US 8,972,554 B2
(45) Date of Patent: Mar. 3, 2015

(54) METHODS AND APPARATUS TO MEASURE MOBILE BROADBAND MARKET SHARE

(75) Inventor: Shi Lu, San Ramon, CA (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 309 days.

(21) Appl. No.: 12/894,347

(22) Filed: Sep. 30, 2010

(65) Prior Publication Data

US 2012/0084430 A1    Apr. 5, 2012

(51) Int. Cl.
*G06F 15/173* (2006.01)
*H04L 12/26* (2006.01)
*G06Q 30/02* (2012.01)
*H04L 29/12* (2006.01)

(52) U.S. Cl.
CPC .............. *H04L 43/065* (2013.01); *G06Q 30/02* (2013.01); *H04L 61/2015* (2013.01); *H04L 61/2514* (2013.01)
USPC ............................ 709/223; 709/224; 709/226

(58) Field of Classification Search
None
See application file for complete search history.

(56) References Cited

U.S. PATENT DOCUMENTS

| 6,751,295 | B2 | 6/2004 | McCulley et al. | |
| 6,754,470 | B2 | 6/2004 | Hendrickson et al. | |
| 7,120,590 | B1 | 10/2006 | Eisen et al. | |
| 7,178,726 | B2 | 2/2007 | Matsumoto | |
| 8,086,217 | B1 * | 12/2011 | Blewett et al. | 455/405 |
| 2003/0204579 | A1 * | 10/2003 | Lutz | 709/223 |
| 2003/0229534 | A1 | 12/2003 | Frangione et al. | |
| 2006/0239266 | A1 * | 10/2006 | Babbar et al. | 370/392 |
| 2007/0255839 | A1 * | 11/2007 | Chang et al. | 709/229 |
| 2008/0228557 | A1 | 9/2008 | Sepehri-Nik et al. | |
| 2009/0186656 | A1 * | 7/2009 | Jain | 455/558 |
| 2009/0222767 | A1 * | 9/2009 | Matthews et al. | 715/835 |
| 2010/0034083 | A1 * | 2/2010 | Prakash et al. | 370/230.1 |
| 2010/0067510 | A1 * | 3/2010 | Roper et al. | 370/339 |
| 2011/0010769 | A1 * | 1/2011 | Jarredal | 726/13 |

* cited by examiner

*Primary Examiner* — Dhairya A Patel
(74) *Attorney, Agent, or Firm* — Hanley, Flight & Zimmerman, LLC

(57) ABSTRACT

Methods and apparatus are disclosed to measure mobile broadband market share. A disclosed example method involves receiving first information indicative of a first network interface device used at a first time, receiving second information indicative of a first Internet protocol (IP) address used at the first time, and identifying an instance of mobile broadband data card Internet access when the first network interface device is a broadband data card and the first IP address is associated with a first broadband Internet service provider (ISP).

23 Claims, 11 Drawing Sheets

| DATA CARD — 502 | SERVICE CLASS — 504 | CANDIDATE PROVIDERS — 506 |
|---|---|---|
| GlobeTrotter Icon 322 | HSUPA<br>HSDPA<br>UMTS<br>EDGE<br>GPRS<br>GSM | AT&T<br>T-Mobile |
| Dell 5720 | EVDO | Sprint<br>Verizon |
| Pantech UM175 | EVDO | Verizon |

| <time/date> | <IP Addr.> | <Active Adapter> | <Responsible ISP> (Whois) | <Connection Type> |
|---|---|---|---|---|
| 12/1/2009 2:46 | 174.151.177.173 | Comcast Mobile 3G | Sprint | BB Data Card |
| 12/5/2009 4:17 | 68.243.56.121 | Comcast Mobile 3G | Sprint | BB Data Card |
| 12/6/2009 5:40 | 173.137.203.8 | Comcast Mobile 3G | Sprint | BB Data Card |
| 12/6/2009 10:21 | 192.168.100.1 | Ethernet | Comcast | Ethernet NIC |
| 12/8/2009 4:26 | 174.151.118.54 | Comcast Mobile 3G | Sprint | BB Data Card |
| 12/11/2009 11:09 | 68.243.35.80 | Comcast Mobile 3G | Sprint | BB Data Card |
| 12/16/2009 7:46 | 99.205.67.86 | Comcast Mobile 3G | Sprint | BB Data Card |
| 12/17/2009 5:43 | 75.94.226.9 | Comcast Mobile 3G | Clearwire | BB Data Card |
| 12/17/2009 8:51 | 192.168.100.1 | Ethernet | Comcast | Ethernet NIC |
| 12/17/2009 6:03 | 62.243.205.42 | Comcast Mobile 3G | Sprint | BB Data Card |
| 12/18/2009 6:20 | 173.136.225.175 | Comcast Mobile 3G | Sprint | BB Data Card |
| 12/18/2009 8:51 | 75.94.226.9 | Comcast Mobile 3G | Clearwire | BB Data Card |
| 12/19/2009 3:53 | 173.6.47.172 | Comcast Mobile 3G | Sprint | BB Data Card |
| 12/19/2009 9:01 | 70.11.219.26 | Comcast Mobile 3G | Sprint | BB Data Card |
| 12/21/2009 4:12 | 75.94.226.9 | Comcast Mobile 3G | Clearwire | BB Data Card |
| 12/21/2009 4:32 | 173.136.35.144 | Comcast Mobile 3G | Sprint | BB Data Card |
| 12/21/2009 10:38 | 70.11.194.21 | Comcast Mobile 3G | Sprint | BB Data Card |
| 12/21/2009 13:47 | 192.168.100.101 | Wireless Network | Comcast | Wireless NIC |
| 12/30/2009 8:32 | 75.94.226.9 | Comcast Mobile 3G | Clearwire | BB Data Card |
| 12/30/2009 8:42 | 99.205.11.221 | Comcast Mobile 3G | Sprint | BB Data Card |
| 12/31/2009 7:33 | 174.151.101.223 | Comcast Mobile 3G | Sprint | BB Data Card |

FIG. 6

METHODS AND APPARATUS TO MEASURE MOBILE BROADBAND MARKET SHARE

FIELD OF THE DISCLOSURE

This disclosure relates generally to market research and, more particularly, to methods and apparatus to measure mobile broadband market share.

BACKGROUND

Service providers, such as media service providers, Internet service providers (ISPs), mobile telephony service providers, and/or mobile broadband ISPs that choose to participate in a market typically need to acquire information about their competitors. Competitive information allows the provider to employ strategic and/or tactical decisions related to opportunities that may increase a subscriber base and/or identify which market areas may be particularly receptive to the services offered by the provider. Additionally, information about the provider and its competitors permits a comparison to reveal market presence and/or market dominance.

Obtaining information related to the presence of competitive providers and/or the market share in any particular geographic market may entail conducting surveys. Surveys, whether oral or written, typically yield low sample rates when compared to the total number of existing subscribers. Additionally, answers to the surveys are usually provided by a human respondent, who is prone to inaccuracy regarding details of their existing provider.

Additionally, because oral and written surveys are perceived as a burden to subscribers, providers are not likely to enjoy opportunities to determine whether the subscriber's status has changed. For example, if the subscriber agrees to answer survey questions at a first time, such subscriber is not likely to also agree to another survey question at a second time (e.g., several months after the first survey). Instead, the subscriber is likely to view the additional survey questions as a burden not worthy of their time.

BRIEF DESCRIPTION OF THE DRAWINGS

FIG. 5 depicts an example mobile broadband data card comparison table that may be used with the example system of FIG. 1.

FIG. 6 depicts an example enhanced log generated by the example system of FIG. 1.

DETAILED DESCRIPTION

Figure 1:
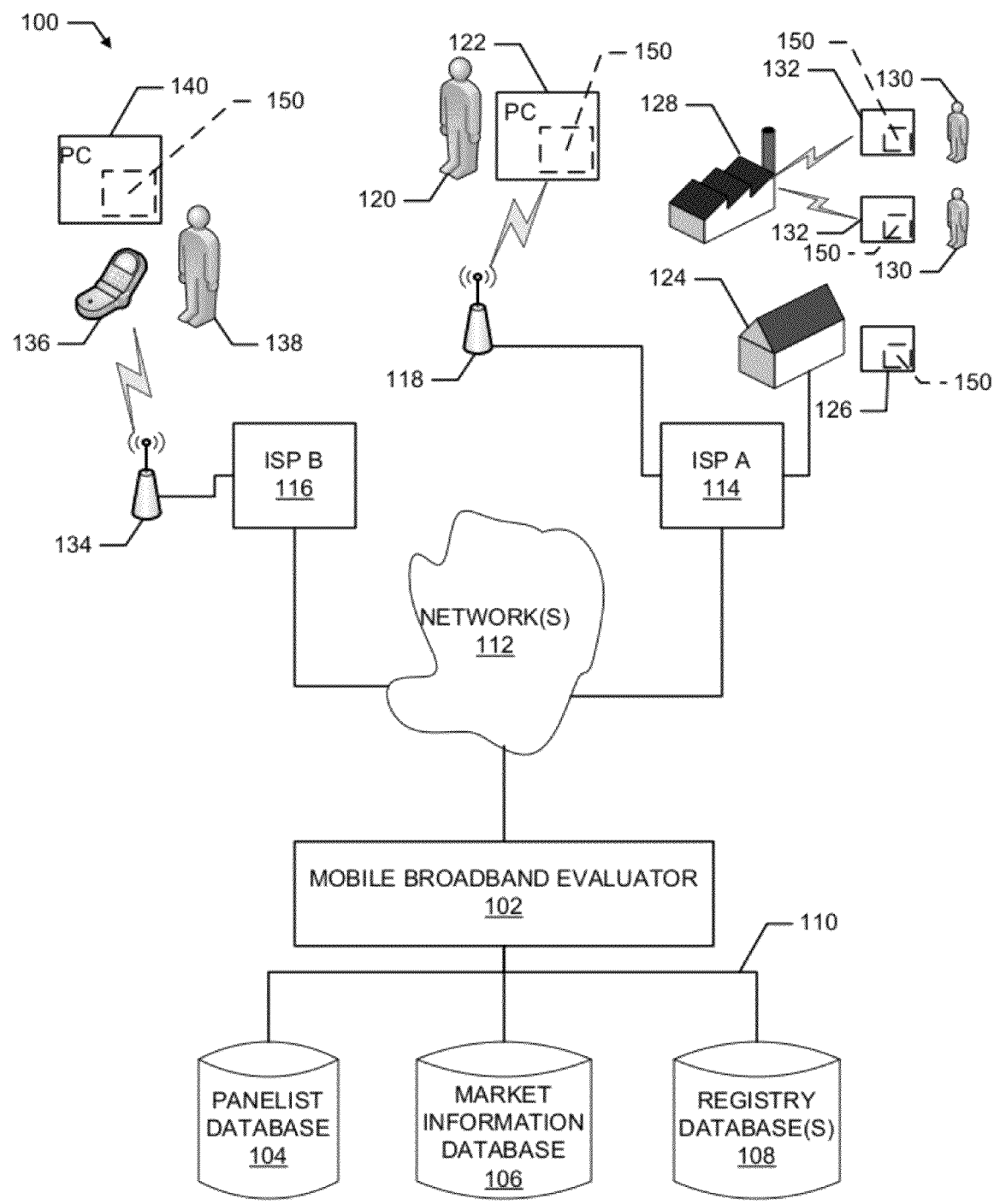
FIG. 1 is a schematic illustration of an example system that may measure mobile broadband market statistics.

Although the following discloses example methods and apparatus including, among other components, software executed on hardware, such methods and apparatus are merely illustrative and should not be considered limiting. For example, any or all of these hardware and software components could be embodied exclusively in hardware, exclusively in software, or in any combination of hardware and software. Accordingly, while the following describes example methods, systems, and apparatus, the examples provided are not the only way to implement such methods, systems and apparatus.

Example methods and apparatus to measure mobile broadband market share are disclosed. A disclosed example method includes receiving first information indicative of a first network interface device used at a first time, receiving second information indicative of a first Internet protocol (IP) address used at the first time, and identifying an instance of mobile broadband data card Internet access when the first network interface device is a broadband data card and the first IP address is associated with a first broadband Internet service provider (ISP).

A disclosed example apparatus includes a remote application interface to receive first information indicative of a first network interface device used at a first time and to receive second information indicative of a first Internet protocol (IP) address used at the first time, an IP address query engine to identify that the first IP address is associated with a first Internet service provider (ISP), and a broadband data card rule manager to identify an instance of mobile broadband data card use when a first adapter is a mobile broadband data card and is associated with the first ISP.

In the event that a provider of services, such as a provider of mobile broadband Internet services, gains or loses subscribers, the provider is particularly interested in learning whether competitors experience a similar gain or loss. For example, if the broadband (BB) Internet service provider (ISP) and one or more competitors experience similar gains in subscribers, then the general market area may be experiencing growth. Such an indication may prompt the BB ISP to increase advertising and/or promotional resources to attempt to capture such growth (e.g., market share) opportunities before one or more competitors capture a greater portion of the available subscribers. Alternatively, if the BB ISP and one or more competitors experience subscriber losses, then the general market area may be stagnant and/or shrinking, which may indicate advertising and/or promotional efforts should focus on one or more alternate markets. On the other hand, in the event that the BB ISP market share is higher than one or more competitors and/or rate of new subscribers to the BBISP is increasing as compared to one or more competitors, then the BB ISP may gain insight to the effectiveness of an advertising campaign and/or a promotion.

In some examples, a consumer uses a desktop, netbook, tablet pc or laptop computer for Internet access from a home or business, to which the Internet services are provided by a broadband ISP (e.g., cable Internet services, digital subscriber line (DSL) services, etc.). Typically, the consumer receives a modem to operate in a fixed location of the home or business, and the modem connects to a twisted pair (e.g., for DSL Internet services) or a coaxial cable (e.g., for cable Internet services). In operation, the modem negotiates a public IP address with the ISP and generates one or more private IP addresses for one or more computers and/or computing devices (e.g., desktop computer, laptop computer, tablet pc, netbook, personal digital assistant, gaming console (e.g., X-Box 360), media extender, WiFi enabled device, etc.) to facilitate Internet services to the home or business.

Recently, ISPs and mobile telephone/data service providers have started providing mobile broadband data cards to enable customers to consume Internet services at broadband speeds without being restricted to a household or business modem (hereinafter referred to herein as "mobile broadband" services). The mobile broadband market is large and growing at such a rate that fixed line (e.g., DSL Internet, cable Internet, etc.) markets for Internet services are threatened. In some instances, mobile telephone companies partner with end-user product manufacturers (e.g., Apple) to facilitate broadband services to end-user devices (e.g., iPad, mobile broadband data cards, etc.). Globally, mobile broadband services are growing and estimated to provide nearly 1 in 3 mobile subscribers with a mobile broadband connection by 2012. Additionally, mobile broadband revenues are expected to grow to over $400 billion by 2012. An interest in such growth is not limited to potential mobile BB ISPs, but concerns telecom carriers, network and marketing organizations, device manufacturers and/or network suppliers. Knowledge of market activity for mobile BB services permits a better understanding of, in part, how to integrate products/services, how to develop products/services, how to price products/services, and/or how to promote products/services.

Customers that have a mobile BB data card installed on a computing device (e.g., desktop, laptop, tablet pc, netbook, etc.) may use the data card to obtain Internet services. However, in some instances the customer may choose to employ other networking adapters to obtain Internet services, such as an Ethernet network interface card (NIC), a WiFi NIC (e.g., a device to send/receive wireless signals that conform to one or more standards proffered by the Institute of Electrical and Electronics Engineers (IEEE), such as IEEE 802.11x), and/or tethering their computing device to a wireless telephone. As such, the mere presence of a mobile BB data card may not reliably indicate that the customer is using mobile BB services. Accordingly, parties interested in actual mobile BB service use cannot obtain a preferred degree of data granularity if only mobile BB data card presence is employed to identify mobile BB service use.

The methods and apparatus described herein facilitate, in part, identification of mobile BB service use details for customers. Mobile BB service use details may be affected by, for example, whether the consumer's computing device has a mobile BB data card, a mobile BB data card plus a NIC, or a NIC without a mobile BB data card. In some examples, the customer may be a mobile BB subscriber even when their computing device does not include a BB data card, such as when the customer is tethering their computing device to a mobile telephone. Generally speaking, the methods and apparatus described herein facilitate data collection to enable a determination of market share of mobile BB data cards, market share of mobile BB services by carrier, mobile BB flow-share by carrier, market share of the computing device on which mobile BB services are rendered, and/or connection patterns of the customer's use of mobile BB data services (e.g., whether mobile BB is used at home and/or while traveling, whether fixed BB services are used at home instead of mobile BB services, frequency of mobile BB service use, whether subscriber is traveling, etc.).

FIG. 1 is an illustration of an example system 100 to measure mobile BB market statistics. In the illustrated example of FIG. 1, the system 100 includes a mobile broadband evaluator 102 communicatively connected to a panelist database 104, a market information database 106, and one or more registry databases 108. The example registry databases 108 may be accessed by the example mobile BB evaluator 102 via a network 110, such as the Internet. As described in further detail below, the example registry databases 108 may identify an association between an Internet protocol (IP) address and its registrant and/or name of the organization that controls/manages the IP address. Such registry databases 108 may include, but are not limited to, information from the American Registry for Internet Numbers (ARIN), the Internet Corporation for Assigned Names and Number (ICANN), IP Geolocation by Maxmind®, etc.

Also described in further detail below, the example panelist database 104 includes information to identify demographic characteristics of panelists that use the example system 100 of FIG. 1. Additionally, the example market information database 106 includes information to identify one or more likely carriers associated with user equipment. User equipment to facilitate mobile BB Internet access may include, but is not limited to data cards manufactured and sold by Dell (5530 HSPA Mobile Broadband Minicard Network Adapter), GlobeTrotter (HSDPA Network Card), Pantech (UM175, UM185, UMW190) and Sierra Wireless (AirCard 550 Adapter, Compass 597 EVDO). Moreover, mobile BB service providers typically provide Internet services via the data card through a specific service class. Services classes include, but are not limited to Evolution Data Optimized (EVDO), and High Speed Packet Access (HSPA), such as the HSDPA protocol and the HSUPA protocol (High Speed Downlink/Uplink Packet Access), CDMA2000 (e.g., 1x and 1xRTT). Other service classes include the global system for mobile communications (GSM), the general packet radio service (GPRS), EDGE and worldwide interoperability for microwave access (WiMAX). In operation, the example mobile BB evaluator 102 may compare a mobile BB data card to the example market information database 106 to determine one or more likely service provider candidates and/or service classes in use by a panelist.

The example mobile BB evaluator 102 is also communicatively connected to one or more networks 112, such as the Internet. Any number of ISPs, such as an example ISP "A" 114 and ISP "B" 116 are communicatively connected to the network 112, in which each ISP provides one or more services to customers. In the illustrated example of FIG. 1, ISP "A" 114 provides mobile BB Internet access via a wireless tower 118 to a mobile user 120 with a laptop 122. Additionally, the example ISP "A" 114 provides fixed BB Internet access to a household 124, within which a computing device 126 (e.g., a desktop, a laptop, tablet pc, netbook, etc.) receives broadband Internet services via a router and/or modem (not shown). Furthermore, the example ISP "A" 114 provides BB Internet access to a business 128 (e.g., a hotel, a coffee shop, an airport, etc.) via a router and/or modem (not shown) to any number of users 130, each of which use a computing device 132 (e.g., a desktop, laptop, tablet pc, netbook, etc.).

In the illustrated example of FIG. 1, ISP "B" 116 provides mobile BB Internet access via a wireless tower 134 to a mobile telephone 136. In this example, a mobile user 138 may have a computing device 140 (e.g., a laptop) without a mobile BB data card configured therein. Instead, the example mobile user 138 may tether the computing device 140 to the example mobile telephone 136 to obtain broadband Internet services. Alternatively, the example computing device 140 may have a mobile BB data card installed therein, but may not be within range of a suitable signal to provide mobile BB Internet services (e.g., a 4G signal). As a result, the example user 138 may choose to tether their mobile telephone 136 to obtain Internet services (e.g., a 3G signal). Each of the example ISP "A" 114 and ISP "B" 116 may employ any number of access routers (not shown) to accommodate its subscriber base for a given geographic area. For example, the example ISP "A" 114 may employ a first access router to service the household 124 and the business 128, and employ a second access router to service the mobile user 120, as described in further detail below.

Each of the example mobile user 120, household 124, business users 130 and/or tethering user 138 may be a panelist. Generally speaking, panelists and/or panelist households may be selected by, for example, a marketing entity to obtain a statistically significant sample size of behavior so that projections to a larger universe may be made with an acceptable degree of confidence. Panelists are typically selected in sufficient numbers to achieve statistical significance and represent one or more particular geographic and/or demographic aspects of a larger universe of participants (e.g., subscribers of mobile BB Internet services). One or more households and/or panelists typically become panelist members based on, in part, an agreement with the monitoring entity (e.g., the marketing entity) to have one or more behaviors monitored, such as the manner in which mobile BB services are consumed.

Participants that are ultimately selected to be panelists provide one or more types of characteristic information. Characteristic information may include, but is not limited to age, income, sex, occupation, home address, business address and/or ethnicity. Without limitation, the panelists may also disclose details of communication devices, computing devices, automobiles, interests, amounts of money spent on utilities, service provider names, etc. Information related to the one or more panelists and/or users of the example system 100 of FIG. 1 is saved in the example panelist database 104. To collect additional information about panelist behavior, the example system 100 of FIG. 1 includes a remote application 150 to execute on each computing device (122, 126, 132, 140). The example remote application 150, which is described in further detail below, may execute in a non-intrusive manner to collect information indicative of the network card in use (e.g., a NIC, NIC with WiFi, mobile BB data card, etc.), a panelist meter identifier, a computer identifier, a local time/date stamp, a log identifier, and/or an IP address assigned by the service provider that is responsible for Internet services.

In operation, the example remote application 150 may periodically, aperiodically, manually, or on a scheduled basis invoke one or more actions on the panelist computing device to obtain information. Actions invoked by the example remote application 150 may include, but are not limited to computing device console operations, computer platform commands, and/or network query operations/commands. Computing device console operations may include, but are not limited to Internet protocol configuration (ipconfig) to display current network configuration values, domain name server (DNS) settings and/or adapters in use by the computing device, network tools to identify routes taken by packets across an IP network (e.g., tracert), and/or commands to report the computing device manufacturer, model number, processor type, random access memory (RAM) installed, computer name, and/or computer serial number. The example remote application 150 may execute for a period of time and transmit collected data to the example mobile broadband evaluator 102, where it may be stored in the example panelist database 104 for future analysis. In some examples, panelist data is collected and saved to the panelist database 104 for a month so that subsequent analysis may reveal trends associated with Internet use and other behavior patterns. Such observed behavior patterns, in the aggregate, may be indicative of market activity that may be projected to a larger audience. Information collected and saved by the example remote application 150 may be stored in the example panelist database 104 segregated by, for example, DNS information, ISP information, IP address information, adapter information (e.g., adapters in use, available adapters, etc.), panelist demographic information, computing device information, connected Internet speed information, etc.

Figure 2:
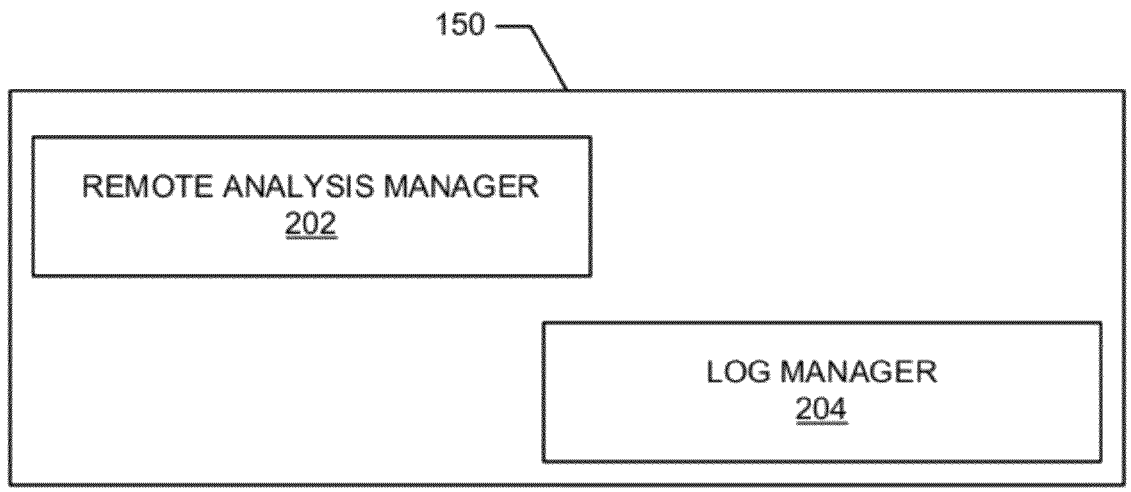
FIG. 2 is a functional block diagram of an example remote application to operate in the system of FIG. 1.

FIG. 2 is a functional block diagram of the example remote application 150 shown in FIG. 1. The example remote application 150 includes a remote analysis manager 202 and a log manager 204. In operation, the example remote analysis manager 202 operates on a periodic, scheduled, aperiodic and/or manual basis to obtain information associated with the computing device on which it resides. For example, the remote analysis manager 202 may invoke an "ipconfig" command in response to detecting that an adapter of the computing device (e.g., computing devices 122, 126, 132, 140) is attempting to secure an Internet connection, or in response to detecting that an adapter of the computing device has successfully established an Internet connection with a private or public IP address. The ipconfig command provides, in part, available adapters associated with the computing device and/or IP address(es) assigned to the computing device.

The example remote analysis manager 202 may also tailor one or more commands in a manner that conforms to the platform of the computing device. For example, Windows-based platform commands use the command "tracert" to execute a networking command to, in part, identify IP packet hops from a source to a destination, while "tracepath" is used by Linux-based platforms to accomplish a similar objective. Without limitation, the example remote analysis manager 202 may employ any command to obtain information about the computing device used by a panelist during Internet connections and/or during one or more attempts to establish an Internet connection. For example, the remote analysis manager 202 may invoke "systeminfo" on Windows-based computing devices to determine, in part, a host name, an operating system in use, computer manufacturer name, computer model information, available memory, a number and type of network card(s) installed in the computing device, etc.

As the example remote analysis manager 202 invokes one or more commands to obtain information about the computing device such collected information is stored by the log manager 204. In the illustrated example of FIG. 2, the log manager 204 may be implemented as memory to store one or more instances of data collected by the remote analysis manager 202. In other examples, the log manager 204 may facilitate communication with a file system of the computing device, within which data collected by the remote analysis manager 202 may be stored. In still other examples, the log manager 204 may be responsive to a request from the example mobile BB evaluator to send all available collected information via the currently enabled adapter.

Figure 3:
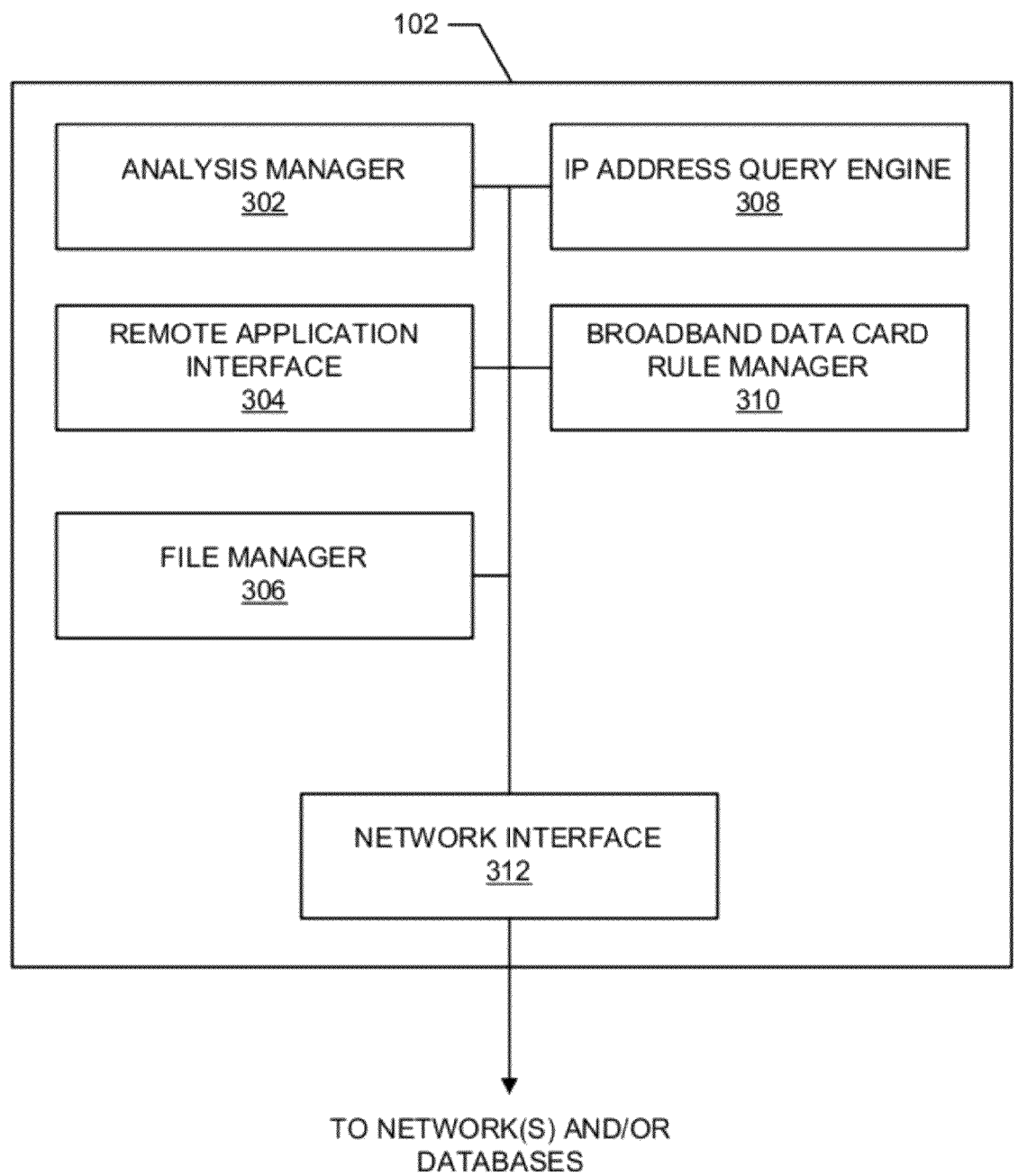
FIG. 3 is a schematic illustration of an example mobile broadband evaluator to operate in the system of FIG. 1.

FIG. 3 is a detailed schematic illustration of the example mobile BB evaluator 102 shown in FIG. 1. The example mobile BB evaluator 102 includes an analysis manager 302 communicatively connected to the market information database 106, a remote application interface 304 communicatively connected to the panelist database 104, a file manager 306, an IP address query engine 308 communicatively connected to one or more registry databases 108, a broadband data card rule manager 310, and a network interface 312. The example analysis manager 302 operates on a periodic, scheduled, aperiodic and/or manual basis to obtain and/or process information associated with panelists and their manner of Internet connectivity with a mobile BB data card. As described in further detail below, the example analysis manager 302 applies one or more rules to determine whether the panelist is consuming Internet services from a fixed provider, a mobile provider, a mobile BB data card, and/or wireless telephone tethering.

In operation, the example analysis manager 302 invokes the remote application interface 304 to acquire panelist data from one or more remote applications such as the example remote application 150 of FIGS. 1 and 2. The remote application interface 304 may invoke the example remote application 150 to transmit collected data associated with a threshold amount of time such as panelist behavior data during a four-week time period. In other examples, the remote application interface 304 may invoke the example remote application 150 to transmit collected data on a daily basis for later analysis by the example analysis manager 302. In still other examples, the example remote application interface 304 may save collected panelist behavior information received and/or otherwise retrieved from one or more remote applications 150 and save such information in the example panelist database 104 for later analysis by the analysis manager 302. The example remote application interface 304 may also be responsive to one or more remote applications 150 that send panelist behavior information without first receiving such requests to do so from the remote application interface 304. For example, in circumstances where the remote application 150 is configured to transmit collected panelist behavior information on a periodic, aperiodic and/or scheduled basis, the remote application interface 304 responds to receipt of such information and stores it in the example panelist database 104 for later analysis.

The example file manager 306 assists the remote application interface 304 when storing panelist behavior data in the example panelist database 104. In operation, the example file manager 306 analyzes the type of information received by the remote application interface 304 to discriminate between DNS information, ISP information, system configuration information, adapter information, panelist demographics information and/or connectivity speed information. DNS information may be identified by the file manager 306 from, for example, an ipconfig and/or nslookup command executed by the example remote analysis manager 202 on the computing device. Such DNS information may include, but is not limited to, DNS IP address information and/or DNS nomenclature, and may be saved in, for example, a comma separated value (CSV) file with an associated time stamp to identify when the DNS information was obtained from the panelist computing device. Similarly, in response to receiving other types of panelist behavior data, one or more CSV files may be generated and/or appended to for later access and analysis.

In the event that the example analysis manager 302 is invoked to perform one or more analysis activities on a set of panelist data collected by the remote application 150 (e.g., a set of data collected over the course of one month), the analysis manager 302 selects a subset of panelist data associated with a time period of interest (e.g., one month). Generally speaking, data analysis may be performed over varying time periods to ascertain one or more usage trends of the panelists that, when projected to a larger audience, may reveal trend information valuable to market researchers and/or other business entities associated with wireless BB Internet services (e.g., service providers, data card hardware manufacturers, etc.).

Figure 4:
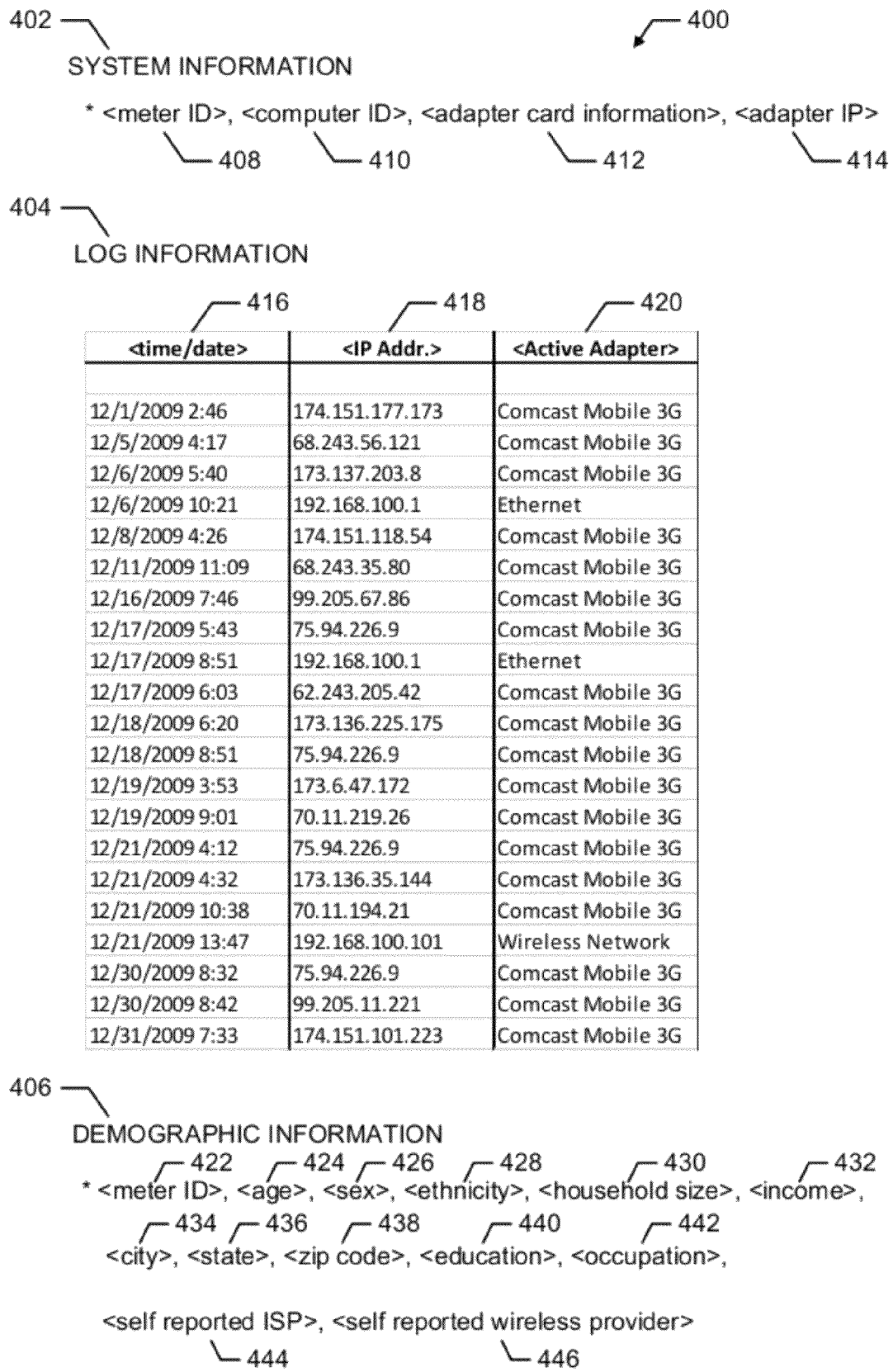
FIG. 4 depicts an example subset of data collected by the examples of FIGS. 1-3.

FIG. 4 illustrates an example subset of data 400 selected by the analysis manager 302. In the illustrated example of FIG. 4, the subset of data 400 includes system information 402, log information 404 and demographic information 406. The example system information 402 may include, but is not limited to, a meter identifier 408, a computer identifier 410, adapter card information 412 and adapter IP address information 414. As described above, one or more commands may be invoked by the example remote analysis manager 202 to acquire the example system information 402 such as a "systeminfo" command on Windows-based platforms. The example subset of data 400 also includes any number of rows of log information 404, each of which includes an associated time and date stamp 416. Each example row also includes an IP address 418 provided and/or otherwise assigned by the service provider, and information associated with the active adapter 420. Generally speaking, because a computing device may have any number of adapters capable of facilitating network connectivity and/or Internet access, each row of log information 404 identifies only the adapter that was active when providing such connectivity.

The example subset of data 400 demographic information 406 may include a meter identifier 422, age information 424, sex information 426, ethnicity information 428, household size information 430, income information 432, city information 434, state information 436, zip code information 438, education information 440, occupation information 442, ISP information 444 and/or wireless provider information 446. Typically, the example ISP information 444 and/or the wireless provider information 446 is self reported by the panelist, which may or may not be accurate. Additionally, while the example ISP information 444 and/or the wireless provider information 446 may be accurate when initially reported, panelists may decide to associate with alternate and/or additional ISPs and/or wireless providers. As such, the methods and apparatus described herein may identify the accuracy of such self reported information.

Returning to the example detailed schematic of FIG. 3, the example broadband data card rule manager 310 analyzes the example subset of data 400 for an indication of a mobile BB data card used by the panelist. Analysis of the type of mobile BB data card is typically a good indicator of which service provider is responsible for providing Internet services to the panelist because, in part, mobile BB data cards must operate with the type of networks managed by such service providers. For example, Verizon Wireless operates a CDMA network with an EV-DO (Rev. A) service class (at the time of this writing), while AT&T Wireless operates a GSM network with an HSPA service class. Additionally, mobile BB data cards are typically tailored to operate on a limited service class and/or network architecture, thereby allowing the list of candidate service providers to be determined to a greater degree of granularity.

Briefly turning to FIG. 5, an example mobile BB data card comparison table 500 illustrates mobile BB data card types and their corresponding service classes and candidate providers. In the illustrated example table 500 of FIG. 5, a data card column 502 includes known mobile BB data cards, a service class column 504 includes known services classes associated with the respective data cards, and a candidate provider column 506 includes known service providers that may operate with respective mobile BB data cards 502. The example mobile BB data card comparison table 500 is not limited to information regarding data card(s) in the example data card column 502, but may also include information regarding MiFi services. The methods and apparatus described herein consider, at least, five ways to facilitate mobile BB services. Mobile BB services may be facilitated by, without limitation, using an external mobile BB card in a personal computer, using a netbook having an embedded mobile BB device(s), tethering with a wireless telephone, using MiFi services via a WiFi signal, and/or sharing mobile BB services via a NIC, such as a laptop/PC/netbook/tablet pc sharing its mobile Internet connection with other PCs in a local area network (LAN). The example mobile BB data card comparison table 500 may be stored in the example market information database 106 and updated when additional and/or alternate information becomes available.

In operation, the example BB data card rule manager 310 may identify the mobile BB data card from the example subset of data 400 to identify a candidate list of service providers that may be responsible for providing the selected panelist with Internet services. For example, if the example subset of data 400 includes nomenclature indicative of "Dell 5720," then the example BB data card rule manager 310 may identify that the panelist receives Internet services via an EVDO service class and that either Sprint or Verizon is providing such services to the panelist. As new BB data cards are introduced into the market and adopted by service providers, the example market information database 106 may be updated to reflect one or more associations between mobile BB data cards, service classes and/or candidate service providers.

Although identification of the type of adapter used by the panelist can provide an indication of the service provider (e.g., ISP) responsible for providing the panelist with Internet services, such information may not yield a desired degree of granularity and/or accuracy. The methods and apparatus described herein may, in part, employ a combination of mobile BB data card information, associated IP addresses used by the mobile BB data card, and/or information indicative of other/alternate adapters on the computing device to determine, in part, the service provider (e.g., the ISP), the method by which the panelist obtains Internet services (e.g., via mobile BB data card, via tethering, via public WiFi, via fixed BB home services, etc.), whether the panelist is traveling or stationary for a time-period of interest, and/or other trends associated with mobile BB Internet activity.

Additional precision, granularity and/or accuracy of service provider identification may be accomplished when the example analysis manager 302 invokes the example IP address query engine 308 in view of the example log information 404 shown in FIG. 4. For example, the IP address query engine 308 may operate on a row-by-row basis on the example log information 404 and invoke an IP address query with one or more registry databases 108. Registry databases 108 may include, but are not limited to the American Registry for Internet Numbers (ARIN), and/or the Internet Corporation for Assigned Names and Number (ICANN). Generally speaking, an ISP (e.g., a service provider of Internet services) registers one or more blocks of IP addresses for use by subscribers. ARIN is one of five Regional Internet Registries (RIRs) that manage IP address resources. Other RIRs include the Asia Pacific Network Information Centre (APNIC) and the Latin American and Caribbean IP Address Regional Registry (LACNIC). ARIN facilitates one or more processes that allow an ISP to register (usually for a fee) one or more IP addresses for exclusive use and to associate the registered IP address with a hostname. ARIN also facilitates a database lookup facility to allow queries (e.g., Whois queries) of an IP address to return a corresponding hostname, organization information, and/or whether the organization has other registered IP addresses (e.g., a block of IP addresses).

In some circumstances, one or more ARIN queries identify an organization that registered the IP address of interest, but such organization may not be the ISP from which the panelist receives Internet services. Instead, the organization may be a reseller of IP addresses rather than the ultimate user and/or provider. For example, an ARIN database query on the IP address 64.236.16.20 identifies "AOL Transit Data Network" as the organization that has registered IP addresses ranging from 64.236.0.0 through 64.236.255.255. However, the ultimate party and/or end-user (e.g., ISP) for the IP address 64.236.16.20 is more accurately determined based on a reverse DNS lookup (also referred to as a reverse resolve) performed by the example remote analysis manager 202 and/or the example analysis manager 302, which reveals a hostname of "www2.cnn.com." Details related to, in part, identifying an ISP are further described in U.S. application Ser. No. 12/695,793, which was filed on Jan. 28, 2010 and is hereby incorporated herein by reference in its entirety.

In response to performing one or more queries to the one or more registry databases 108, the example IP address query engine 308 may determine whether the IP address associated with the active adapter is public or private. Typically, the determination of whether the IP address is public or private occurs prior to the example remote analysis manager 202 and/or the example analysis manager 302 querying one or more registry databases 108. Private IP addresses may be used by an ISP with network address translation (NAT) techniques to distribute Internet services over a private network. The quantity of public IP addresses is finite and blocks of private IP addresses may operate within a private network that are serviced by a single public IP address, thereby allowing a greater number of end-users to consume network services from a single public IP address. The Internet Assigned Numbers Authority (LANA) cooperates with the RIRs to manage IP allocations on a global basis and has reserved three blocks of IP address ranges designated for private use. A first LANA-reserved private block starts at 10.0.0.0 and ends at 10.255.255.255, thereby providing over 16 million available IP addresses for private use. A second LANA-reserved private block starts at 172.16.0.0 and ends at 172.31.255.255, thereby providing over one million available IP addresses for private use. A third LANA-reserved private block starts at 192.168.0.0 and ends at 192.168.255.255, thereby providing over 65 thousand available IP addresses for private use.

In the event that the adapter IP address is private, one or more commands (e.g., computer network applications, traceroute, etc.) may be employed by the example remote analysis manager 202 and/or the example analysis manager 302 to identify a last hop router and provide an indication of the ISP. After determining an IP address and/or host name associated with the last hop router, one or more queries (e.g., computer network applications, whois, etc.) to the example registry databases 108 may reveal the ISP. The information collected regarding an active mobile BB data card as the adapter, the private IP address and the corresponding router credentials confirm that the panelist is using mobile BB services with a mobile BB data card via NAT from the identified ISP.

On the other hand, in the event that the adapter IP address is public, one or more queries to the example registry databases 108 may reveal the ISP. The information collected regarding an active mobile BB data card as the adapter, the public IP address and the corresponding ISP from the registry database 108 query(ies) confirm that the panelist is using mobile BB services with a mobile BB data card from an ISP that has allocated a public IP address to that panelist.

In still other examples, when the example BB data card rule manager 310 identifies the presence of a mobile BB data card adapter on the panelist computing device, but in an inactive state (e.g., the associated IP address is NULL or set to 0.0.0.0, etc.), then the example analysis manager 302 determines the manner in which panelist Internet services are provided. In operation, the example analysis manager 302 and/or BB data card rule manager 310 checks an activity status of other adapters associated with the computing device, such as the active adapter card 420 identified in the example subset of data 400. If the adapter is a WiFi NIC with a private IP address, then the panelist is deemed to be using a WiFi router from a fixed BB modem (e.g., at home). In some circumstances, the panelist may be using a MiFi device or a wireless telephone hotspot, which may be determined/confirmed by checking the public IP address of the panelist. If the adapter is a WiFi NIC with a public IP address, then the panelist is deemed to be using a WiFi signal provided by a business such as an airport or hotel. Similarly, if the adapter is an Ethernet NIC with a private IP address, then the panelist is deemed to be using a router from a fixed BB modem (e.g., at home), and if the adapter is an Ethernet NIC with a public IP address, then the panelist is deemed to be using services provided by a business, such as an airport or hotel.

For circumstances in which the example BB data card rule manager 310 identifies the absence of a mobile BB data card adapter on the panelist computing device, while BB services are consumed by the panelist, the BB data card rule manager 310 identifies other adapters for the possibility of tethering. When a user tethers with a computing device, an adapter connects to a wireless telephone to provide Internet services. The adapters to facilitate tethering activity include, but are not limited to, a universal serial bus (USB) port connected to the wireless telephone via a cable, a Bluetooth® connection between the computing device and the wireless telephone and/or a WiFi connection between the computing device and the wireless telephone. In some circumstances, the wireless telephone may establish a mobile "hotspot" by broadcasting a WiFi signal within a finite range of the wireless telephone or mobile wireless router that distributes Internet services from the wireless service provider.

In operation, the example BB data card rule manager 310 searches the example subset of data 400 for an indication of an adapter capable of tethering. For example, Apple® provides a tethering service to subscribers in which the adapter appears as "Apple iPhone" or "Apple Mobile Device Ethernet." Alternate and/or additional adapter nomenclature may be used by wireless service providers, and such nomenclature may be stored in the example market information database 106 to facilitate future identification of adapters capable of tethering activity. Additionally, as new and/or alternate adapters are identified, such nomenclature may be added to the example market information database 106. In the event that the panelist is deemed to be tethering, the private IP address assigned by the wireless device (e.g., a wireless telephone, a WiFi device) may be analyzed to distinguish between a single-use tether or a local "hotspot" created by a WiFi device. For example, if the private IP address assigned by the wireless device is at a relatively low value, such as 192.168.0.0, then tethering activity may be limited to a single user. However, if the private IP address assigned by the wireless device is of a higher value, such as 192.168.0.3, then the wireless device may be broadcasting a "hotspot" for authorized users, thereby indicating the possibility of a WiFi device or a wireless telephone that generates a "hotspot."

After the example mobile BB evaluator 102 and the one or more remote applications 150 on one or more panelist computing devices collects information associated with Internet connectivity, the example analysis manager 302 builds an enhanced log 600, as shown in FIG. 6. In the illustrated example of FIG. 6, the enhanced log 600 includes data fields similar to those shown in FIG. 4. Such data fields may be arranged in any number of rows to indicate an instance of Internet service that occurred on the panelist computing device. The example enhanced log 600 includes a time and date stamp field 616, an IP address field 618, and an active adapter field 620, similar to the data fields illustrated in the example subset of data 400 shown in FIG. 4. Additional data fields generated by the example analysis manager 302 include a responsible ISP field 622 and a connection type field 624. Connection types may include, but are not limited to, mobile BB data card, fixed BB WiFi, fixed BB Ethernet and/or tethering. While the example enhanced log 600 of FIG. 6 illustrates five data fields of information, greater or fewer fields may be generated by the example analysis manager 302 for use with panelist mobile BB Internet use analysis purposes. For example, the enhanced log 600 may include data fields indicative of connection speed and/or whether the ISP is a reseller.

The methods and apparatus described herein allow identification of instances where the panelist travels with a mobile BB data card versus when the mobile BB data card is used for Internet access while stationary and/or at a home location. Additionally, the methods and apparatus described herein allow identification of mobile BB data card usage trends/ patterns that may be projected to a larger population for marketing purposes. When a computing device (having a mobile BB data card installed therein) powers-up, a dynamic host configuration protocol (DHCP) facilitates the process of obtaining an IP address. Each time the computing device is powered-down and powered-up again, DHCP negotiates another IP address or, in some circumstances, maintains an IP address used previously. While circumstances of a panelist receiving multiple different IP addresses in one day may be indicative of panelist travel throughout that day, additional verification may need to occur to consider the possibility that the panelist is not traveling, but that the DHCP protocol is assigning a new IP address when the panelist powers-up their computing device from the same location.

In the illustrated example of FIG. 6, the example analysis manager 302 analyzes the enhanced log 600 to determine whether and how often the panelist uses their mobile BB data card while traveling or when stationary. As described in further detail below, circumstances where the panelist uses dissimilar IP addresses in a day may be associated with a stationary panelist, while other circumstances where the panelist uses dissimilar IP addresses in a day may be associated with a traveling panelist.

In a first example, the panelist used two separate IP addresses (i.e., 173.6.47.172 and 70.11.219.26) on Dec. 19, 2009 at 3:53 and 9:01 (see rows 602 and 604, respectively). At this point, the example enhanced log 600 also indicates that both instances were associated with an IP address owned and/or otherwise operated by Sprint, but certainty regarding a stationary or a traveling user cannot be obtained without additional information. For example, one possibility is that the DHCP server simply selected another separate IP address during the second instance (i.e., at 9:01) of the computing device being powered-up. On the other hand, another possibility is that the other separate IP address was assigned as a function of the panelist being located in another geographic location serviced by a separate access router of the Sprint network, thereby suggesting that the panelist is traveling with the mobile broadband data card.

To reconcile the aforementioned uncertainty, the methods and apparatus described herein employ the example analysis manager 302 to identify whether more than one connection/ access router was used for each IP address assigned via DHCP. In particular, the example analysis manager 302 invokes a traceroute network command for the first IP address (e.g., tracert 173.6.47.172) and for the second IP address (e.g., tracert 70.11.219.26). Each access router can serve hundreds of customers, so if the resulting access router is the same for both traceroute results, then the panelist is not likely to be traveling. On the other hand, if the resulting access router is not the same, then the panelist is deemed to be traveling.

In the illustrated example enhanced log 600 of FIG. 6, the access router corresponding to both IP addresses on Dec. 19, 2009 is the same (at the time of this writing the access router is s1-sprin904-258830-0.sprintlink.net 144.228.132.142). In other words, while the DHCP assigned separate public IP addresses to the mobile BB data card, each was still associated with the same access router, thereby indicating that the panelist is not traveling.

In a second example, the panelist used three separate IP addresses on Dec. 21, 2009. The ISP associated with each of these instances is shown in the example responsible ISP column 622, and indicates that the panelist was serviced by two separate ISPs (i.e., one instance of Clearwire 650 and two instances of Sprint 652 and 654, respectively). Although the panelist is deemed to have been traveling between the first and second instances (i.e., between obtaining the IP address 75.94.226.9 at 4:12 and obtaining the IP address 173.136.35.144) because dissimilar ISPs were responsible for the service(s), there is not enough information to determine whether the panelist was traveling between the second and third instances because the same ISP is responsible for those services. To determine whether the panelist was traveling between the second and third instances of receiving an IP address from DHCP, the example analysis manager 302 invokes the traceroute network command for the second IP address (e.g., tracert 173.136.35.144) and for the third IP address (e.g., tracert 70.11.194.21). At the time of this patent was written, the access router associated with the second IP address was not the same as the access router associated with the third IP address, thereby indicating that the panelist was traveling.

While an example manner of implementing the mobile broadband evaluator 102 and the remote application 150 of FIGS. 1-3 has been illustrated in FIGS. 7-10, one or more of the elements, processes and/or devices illustrated in FIGS. 7-10 may be combined, divided, re-arranged, omitted, eliminated and/or implemented in any other way. Further, the example mobile broadband evaluator 102, the example remote application 150, the example remote analysis manager 202, the example log manager 204, the example analysis manager 302, the example remote application interface 304, the example file manager 306, the example IP address query engine 308, and/or the example broadband data card rule manager 310 of FIGS. 7-10 may be implemented by hardware, software, firmware and/or any combination of hardware, software and/or firmware. Thus, for example, any of the example mobile broadband evaluator 102, the example remote application 150, the example remote analysis manager 202, the example log manager 204, the example analysis manager 302, the example remote application interface 304, the example file manager 306, the example IP address query engine 308, and/or the example broadband data card rule manager 310 could be implemented by one or more circuit(s), programmable processsor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example mobile broadband evaluator 102, the example remote application 150, the example remote analysis manager 202, the example log manager 204, the example analysis manager 302, the example remote application interface 304, the example file manager 306, the example IP address query engine 308, and/or the example broadband data card rule manager 310 are hereby expressly defined to include a computer readable medium such as a memory, DVD, CD, etc. storing the software and/or firmware. Further still, the example mobile broadband evaluator 102, the example remote application 150, the example remote analysis manager 202, the example log manager 204, the example analysis manager 302, the example remote application interface 304, the example file manager 306, the example IP address query engine 308, and/or the example broadband data card rule manager 310 of FIGS. 7-10 may include one or more elements, processes and/or devices in addition to, or instead of, those illustrated in FIG. 7-10, and/or may include more than one of any or all of the illustrated elements, processes and devices.

A flowchart representative of example machine readable instructions for implementing the example mobile broadband evaluator 102 and the example remote application 150 of FIGS. 1-3 is shown in FIGS. 7-10. In these examples, the machine readable instructions comprise a process for execution by a processor such as the processor P105 shown in the example computer P100 discussed below in connection with FIG. 11. The process may be embodied in software stored on a computer readable medium such as a CD-ROM, a floppy disk, a hard drive, a digital versatile disk (DVD), or a memory associated with the processor P105, but the entire process and/or parts thereof could alternatively be executed by a device other than the processor P105 and/or embodied in firmware or dedicated hardware. Further, although the example process is described with reference to the flowchart illustrated in FIGS. 7-10, many other methods of implementing the example mobile broadband evaluator 102 and the example remote application 150 may alternatively be used. For example, the order of execution of the blocks may be changed, and/or some of the blocks described may be changed, eliminated, or combined.

As mentioned above, the example processes of FIGS. 7-10 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 7-10 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Figure 7:
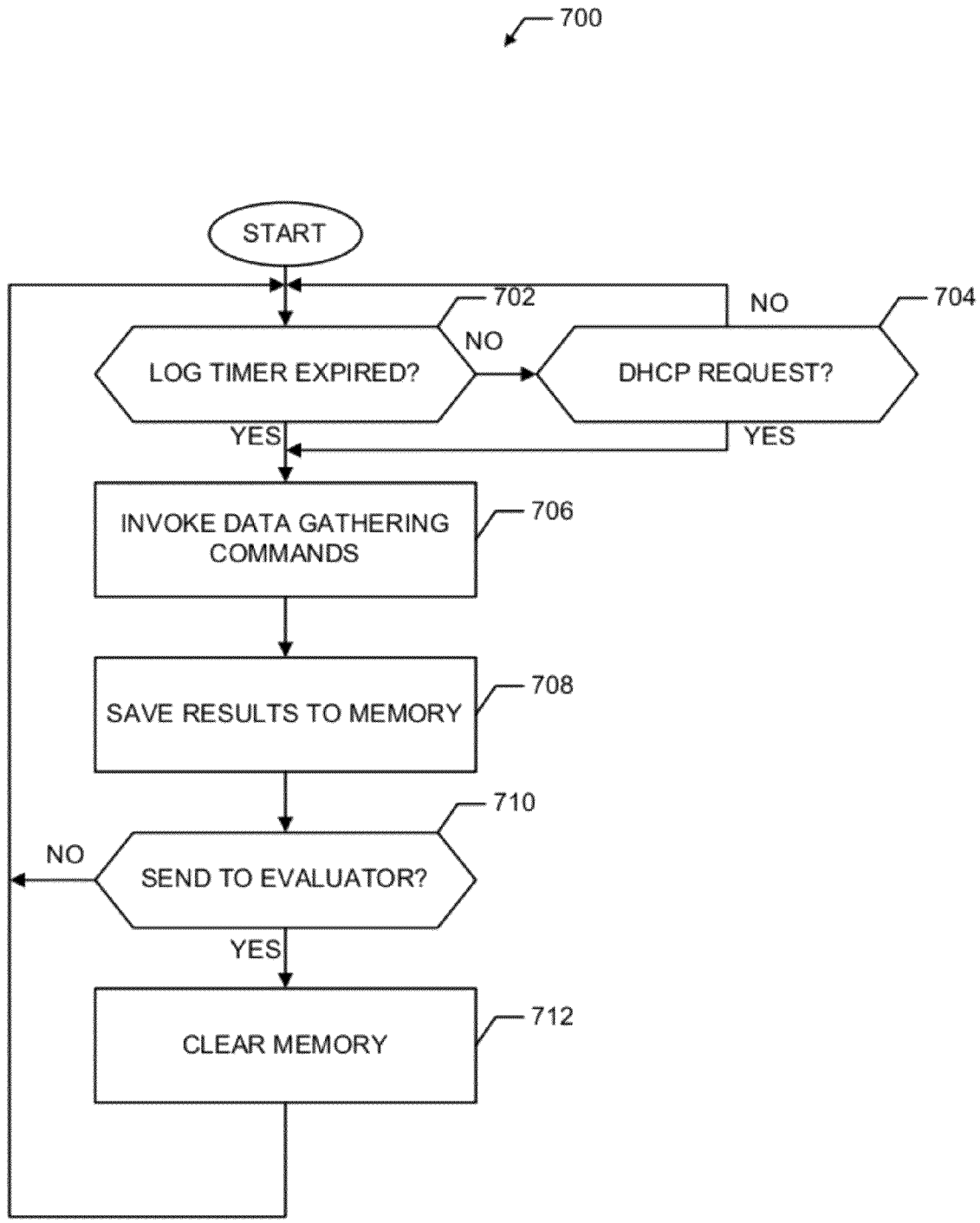
FIGS. 7-10 depict flow diagrams of example processes to measure mobile broadband market share.

The process 700 of FIG. 7 begins at block 702, in which the example remote application 150 determines whether a log timer has expired. As described above, the example remote application 150 may operate periodically, aperiodically, manually, or on a scheduled basis to invoke one or more actions on the panelist computing device to obtain information regarding panelist behavior. If the log timer has not expired (block 702), the example remote application 150 determines whether the computing device has initiated and/or otherwise invoked a DHCP request (block 704). The DHCP request (block 704) may occur based on, for example, circumstances where the panelist makes an attempt to utilize Internet services on the computing device. In the event that the computing device connects via a fixed line BB router at home, the DHCP request may assign a private IP address. On the other hand, in the event that the computing device connects via a mobile BB data card, the DHCP request may assign either a private or a public IP address. If the example remote application 150 does not identify the occurrence of any DHCP request (block 704), then the example process 700 of FIG. 7 continues to monitor for the log timer to expire (block 702) and/or an instance of a DHCP request (block 704).

When the example remote application 150 identifies that the log timer expires (block 702) or a DHCP request occurs (block 704), the example remote application 150 invokes one or more data gathering commands (block 706). Data gathering commands, as described above, may include network data gathering commands and/or data gathering commands to determine details related to the panelist computing device. For example, when "ipconfig" (e.g., for Windows-based computing devices) is invoked by the example remote application (block 706), current network configuration values, DNS settings and/or available adapters may be determined. In other examples, when "systeminfo" (e.g., for Windows-based computing devices) is invoked by the example remote application (block 706), information indicative of host name, operating system in use, computer manufacturer, computer model, available memory and/or a number and type of network card(s) may be determined. In some examples, upon detection of a private IP address (block 704), the example remote application 150 may invoke a "tracert" command (e.g., for Windows-based computing devices) to obtain information indicative of a public IP address and/or more accurate information regarding the ISP responsible for providing Internet services.

Results from the one or more data gathering commands (block 706) may be saved to a memory (block 708), such as a memory of the example remote application 150 and/or a memory associated with the panelist computing device (e.g., a hard drive, flash memory, etc.). The example remote application 150 may determine whether collected and saved results should be sent to the example mobile BB evaluator 102 (block 710). In some examples, collected data may be saved on the panelist computing device for a period of time (e.g., 1-month) before sending to the mobile BB evaluator 102 (block 710), while in other examples the collected information may be sent on a day-by-day basis. After the collected data is sent to the example mobile BB evaluator 102 (block 710), the memory may be cleared (block 712) to allow additional data to be collected in the future. Control returns to block 702.

Figure 8:
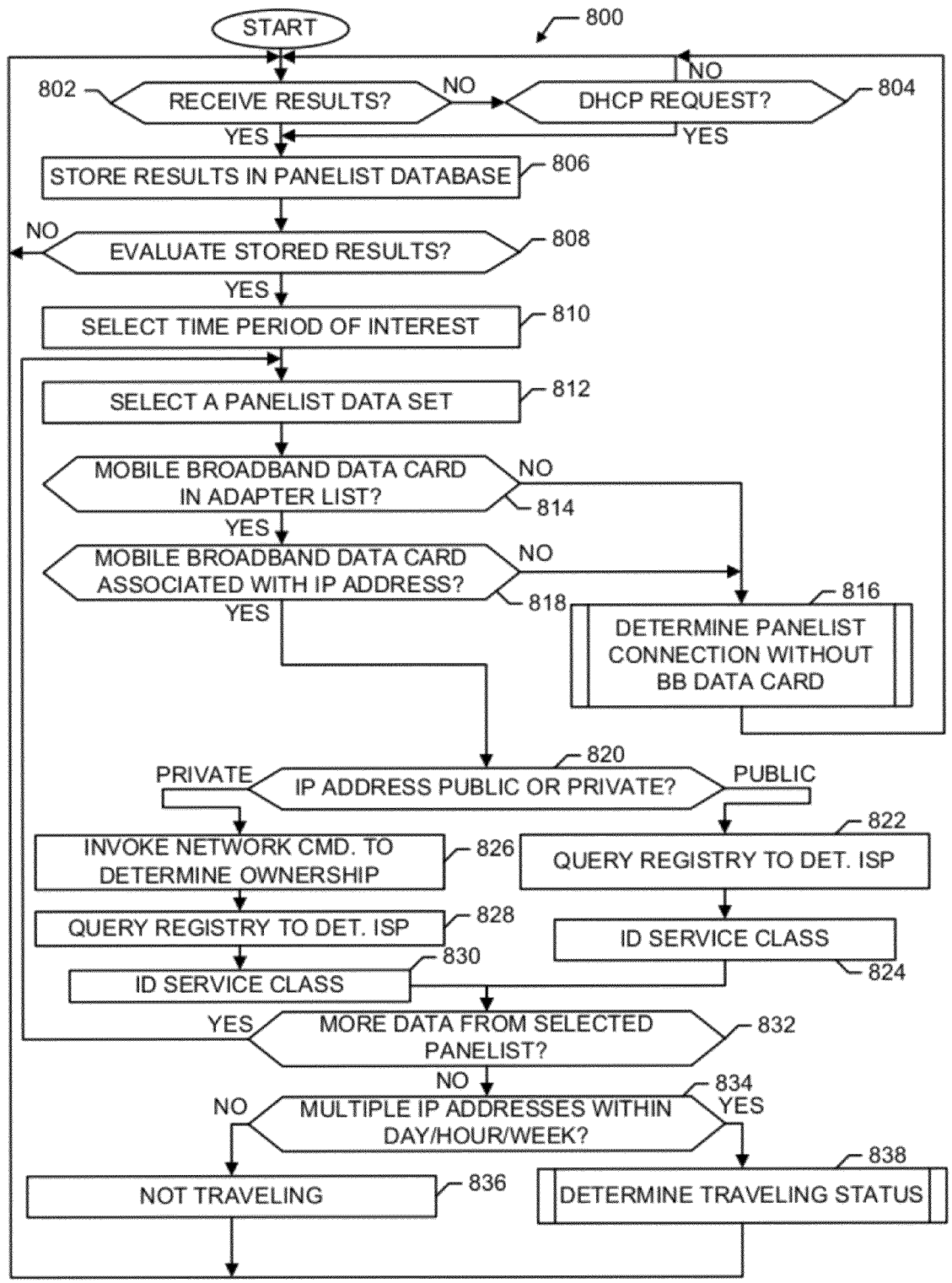

The process 800 of FIG. 8 begins at block 802 to determine whether an instance of results has been received from a panelist. As described above, the example remote application 150 may send collected data on a periodic, aperiodic, scheduled or manual basis, and the example mobile BB evaluator 102 is configured to monitor for such sent data (block 802). If no such collected data is detected by the example mobile BB evaluator 102 (block 802), the mobile BB evaluator 102 determines whether it should submit a request to have the remote application 150 send such data (block 804). In some examples, the example remote application 150 may be configured to operate in a mode responsive to the requests of the mobile BB evaluator 102 to, for instance, conserve processing resources on the panelist computing device. In the event that the mobile BB evaluator 102 requests one or more results from the remote application 150 (block 804), the example mobile BB evaluator 102 stores the results in the example panelist database 104 (block 806). The results may be stored in a manner that associates panelist information (e.g., demographics information) with the panelist network information and/or system information.

On a periodic, aperiodic, scheduled or manual basis, the example mobile BB evaluator 102 evaluates one or more results stored in the example panelist database 104 (block 808). In some examples, the mobile BB evaluator 102 evaluates results for each panelist on a daily basis to identify, for example, whether the panelist was using the mobile BB data card for Internet services while travelling. On other examples, the mobile BB evaluator 102 evaluates results for each panelist on a monthly basis to identify, for example, usage trends for mobile BB data card activity. If the mobile BB evaluator 102 does not need to evaluate stored panelist data (block 808), control returns to block 802 to monitor for additional data sent by one or more remote applications 150. On the other hand, when the mobile BB evaluator 102 determines that it is time to evaluate information associated with one or more panelists (block 808), a time period of interest is selected (block 810) such as 1-month of data between the beginning and end of December 2009. A data set associated with a panelist during the selected time period of interest is selected (block 812) such as the example data set 400 shown in FIG. 4. The data set may include, but is not limited to DNS information, IP addresses used throughout the time period of interest, system configuration information, connection speed information, panelist demographics information, etc.

The example analysis manager 302 of the mobile BB evaluator 102 invokes the example BB data card rule manager 310 to determine whether one or more mobile BB data cards are listed in the selected data set (block 814). If not, then the example analysis manager 302 determines the manner in which the panelist connects to Internet services when no mobile BB data card is in use (block 816), as described in further detail below in conjunction with FIG. 9.

Figure 9:
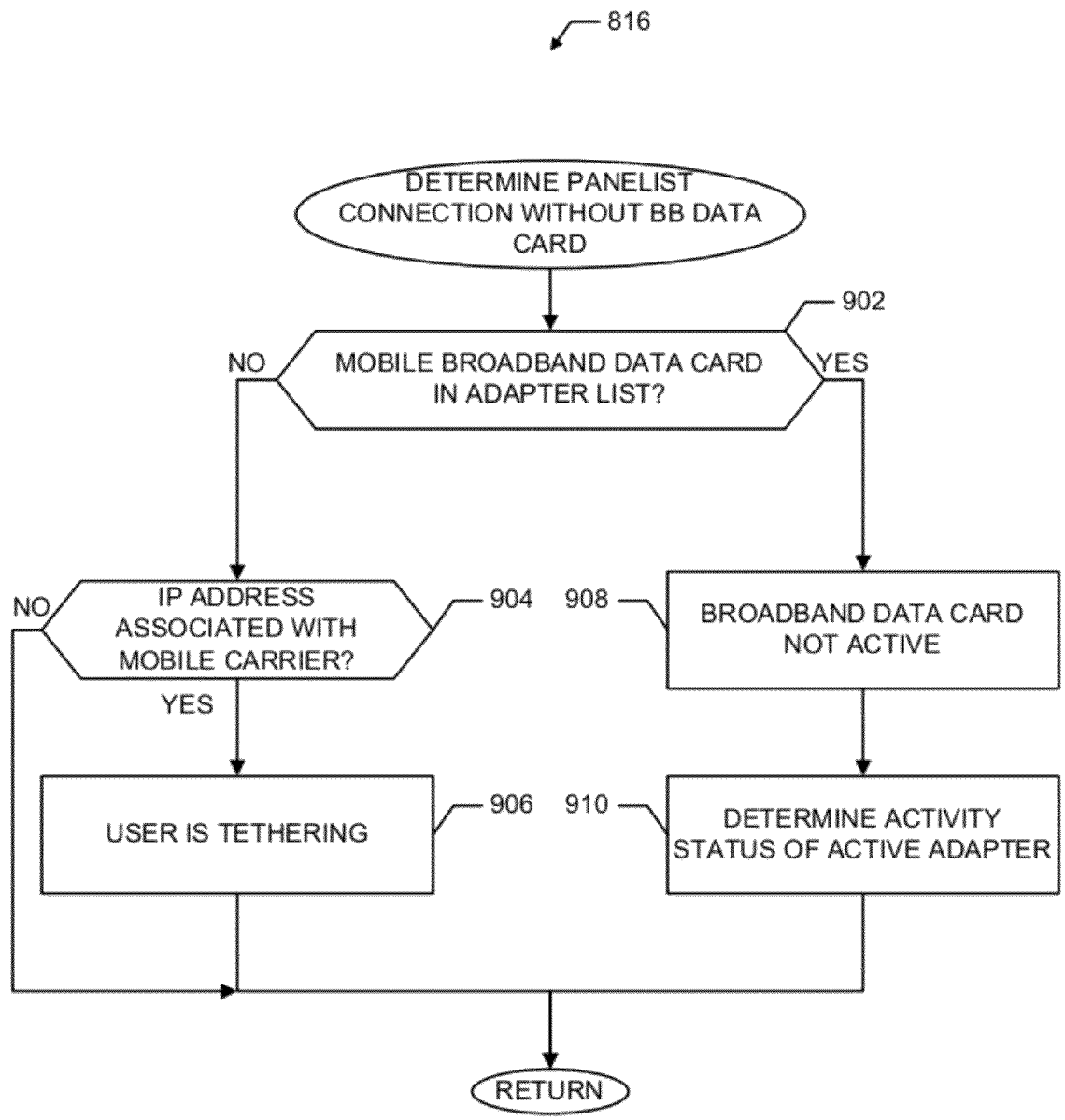

Briefly turning to FIG. 9, an example process 900 to determine a manner of the panelist connection when no mobile BB data card is used is shown. The example BB data card rule manager 310 determines whether a mobile BB data card is present within the panelist computing device (block 902). For example, the BB data card rule manager 310 may compare adapter information collected by the remote application 150 to a list of known mobile BB data cards 500 of FIG. 5. In the event that no matches occur, the IP address query engine 308 determines whether the IP address is associated with a mobile carrier (block 904). If not, the example process 900 exits, otherwise the analysis manager deems the panelist to be tethering (block 906). In particular, the example analysis manager 302 may review the adapter list for nomenclature indicative of tethering activity, such as "Apple iPhone" or "Apple Mobile Device Ethernet." Alternate and/or additional adapter nomenclature may be used by wireless service providers and such nomenclature may be stored in the example market information database 106 to facilitate future identification of adapters capable of tethering activity.

On the other hand, in the event that there is a mobile BB data card installed on the panelist computing device (block 902), the mobile BB data card does not have an associated IP address. Accordingly, the mobile BB data card is deemed not active (block 908) and the example analysis manager 302 identifies which one of the panelist adapters has an associated IP address (block 910). If the adapter has a private IP address and includes nomenclature indicative of Ethernet or wireless capabilities, the panelist is deemed to be obtaining Internet services via a fixed-line BB network such as a home router. However, if the adapter has a public IP address and includes nomenclature indicative of Ethernet or wireless capabilities, the panelist is deemed to be obtaining Internet services via a fixed-line BB network at a business such as at an airport or a hotel.

Returning to FIG. 8, if the example BB data card rule manager 310 determines that the panelist computing device has a mobile BB data card (block 814), then the BB data card rule manager 310 determines whether the mobile BB data card has an associated IP address (block 818). If not, then Internet access is likely provided to the panelist's computing device via a different adapter, which is examined by the mobile BB evaluator 102 (block 816). However, if the mobile BB data card has an associated IP address (block 818), the IP address query engine 308 examines the IP address to determine whether it is public or private (block 820).

In circumstances where the IP address is public (block 820), the example IP address query engine 308 initiates one or more queries to the example registry database(s) 108 to determine the ISP (block 822). Based on, in part, the fact that the panelist has a mobile BB data card associated with a public IP address, the example analysis manager 302 confirms that the panelist was consuming mobile BB Internet services and can identify the service class during that instance of service (block 824). For example, the identified mobile BB data card may be compared to the example market information database 106 to determine what type of service class is being used by the panelist. As described above, the market information database 106 may be updated with information related to available and/or known mobile BB data cards and/or their corresponding capabilities. Mobile BB data card capabilities may include service classes with which they are designed to operate, such as HSUPA, HSDPA, UMTS, EDGE, GPRS, GSM and/or EVDO. For example, when the information regarding the panelist mobile BB data card (e.g., Pantech UM175) is combined with the information from the example IP address query engine 308 (e.g., Verizon), then the example market information database 106 can reveal the only possible service class as EVDO.

On the other hand, in the event that the IP address is private (block 820), the example analysis manager 302 and/or the IP address query engine 308 may invoke one or more network commands to reveal an ownership status associated with the private IP address (block 826). As described above, the example remote application 150 may invoke a tracert networking command in response to detecting a private IP address, which reveals a last hop router indicative of the ISP. The example analysis manager 302 may send a request to the remote application 150 to perform the networking command (s) if such commands were not previously performed by the remote application 150. Other networking commands invoked by the analysis manager 302 and/or the IP address query engine 308 include, but are not limited to nslookup (block 826).

After obtaining information indicative of the ISP, the example IP address query engine 308 queries one or more registry database(s) 108 to confirm the ISP (block 828). In view of the fact that the ISP issued and/or caused to be issued (e.g., via DHCP) a private IP address, the panelist is deemed to be receiving IP services via NAT. Based on, in part, the fact that the panelist has a mobile BB data card associated with a private IP address, which is further processed to derive the ISP, the example analysis manager 302 confirms that the panelist was consuming mobile BB Internet services via NAT and can identify the service class during that instance of service (block 830). As described above, the example market information database 106 may be used to reveal the service class by process of elimination and/or comparison with known adapters and ISPs, such as is shown in the example comparison table 500 of FIG. 5.

After identifying a corresponding ISP, service class, and/or whether or not NAT is employed by the ISP, the example analysis manager determines whether more data is available from the selected panelist during the time period of interest (block 832). If so, control returns to block 812 to select a panelist data set, otherwise the data sets are further analyzed to determine whether the panelist was traveling with the mobile BB data card (block 834). In particular, the example analysis manager 302 reviews the collected data for the selected time period of interest for the panelist, such as the example enhanced log 600 of FIG. 6. In the event that the analysis manager 302 reviews the enhanced log 600 and does not identify any instances where multiple different IP addresses occur within a time period of interest (e.g., a day, a week, a month, etc.) (block 834), then the example mobile BB evaluator 102 deems that the user was not traveling or stationary for that time period of interest (block 836). However, in the event that the analysis manager 302 reviews the enhanced log 600 and identifies one or more instances where multiple different IP addresses occur within the time period of interest (block 834), then the analysis manager 302 distinguishes a traveling panelist from a panelist that is not traveling (block 838).

Figure 10:
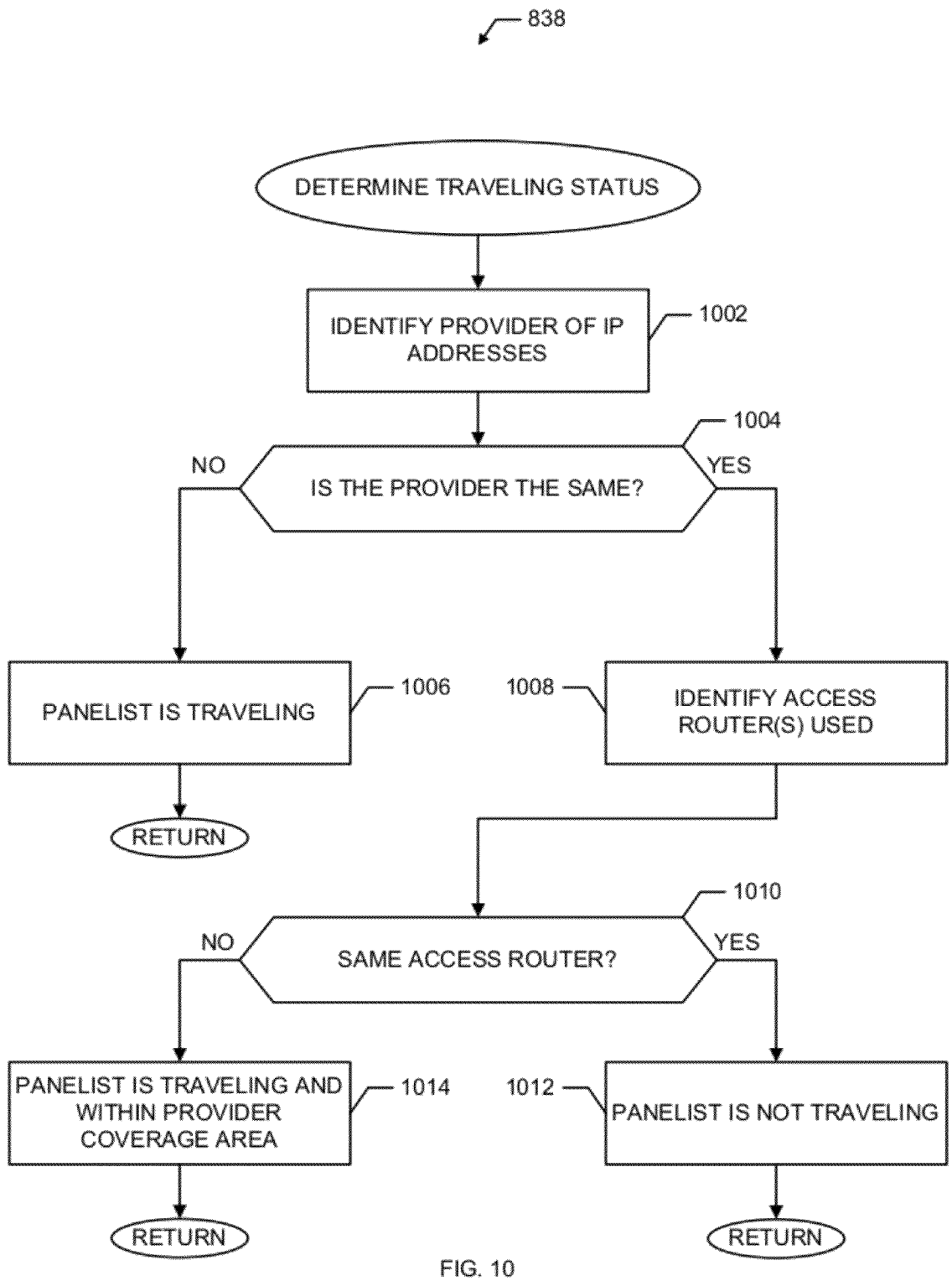

The process 838 of FIG. 10 begins at block 1002 to identify a provider of one or more IP addresses. As described above, one or more queries via the example IP address query engine 308 to one or more registry database(s) 108 may reveal IP ownership and/or registration information. In the event that the provider nomenclature is indicative of different providers (block 1004), then the panelist is deemed to be traveling (block 1006) and the example process 838 exits.

However, if the information regarding provider nomenclature is indicative of the same provider (block 1004), the possibility exists that the panelist is either not traveling or is traveling within the available network coverage for a given ISP. To distinguish between these possibilities, the example IP address query engine 308 invokes one or more networking commands to identify which access routers are used by each IP address (block 1008). As described above, each access router can serve hundreds of customers. Thus, if the same access router is identified at multiple adjacent periods of time, the panelist is not likely to be traveling. However, if different access routers are used to provide Internet services to the panelist via the mobile BB data card, then the example analysis manager 302 deems the panelist to be traveling. The one or more networking commands to identify the access router(s) used (block 1008) include, but are not limited to the tracert networking command (for Windows-based platforms). If the access routers are the same (block 1010), then the panelist is not traveling (block 1012). On the other hand, if the access routers are different (block 1010), then the panelist is deemed to be traveling and within the provider coverage area (block 1014).

Figure 11:
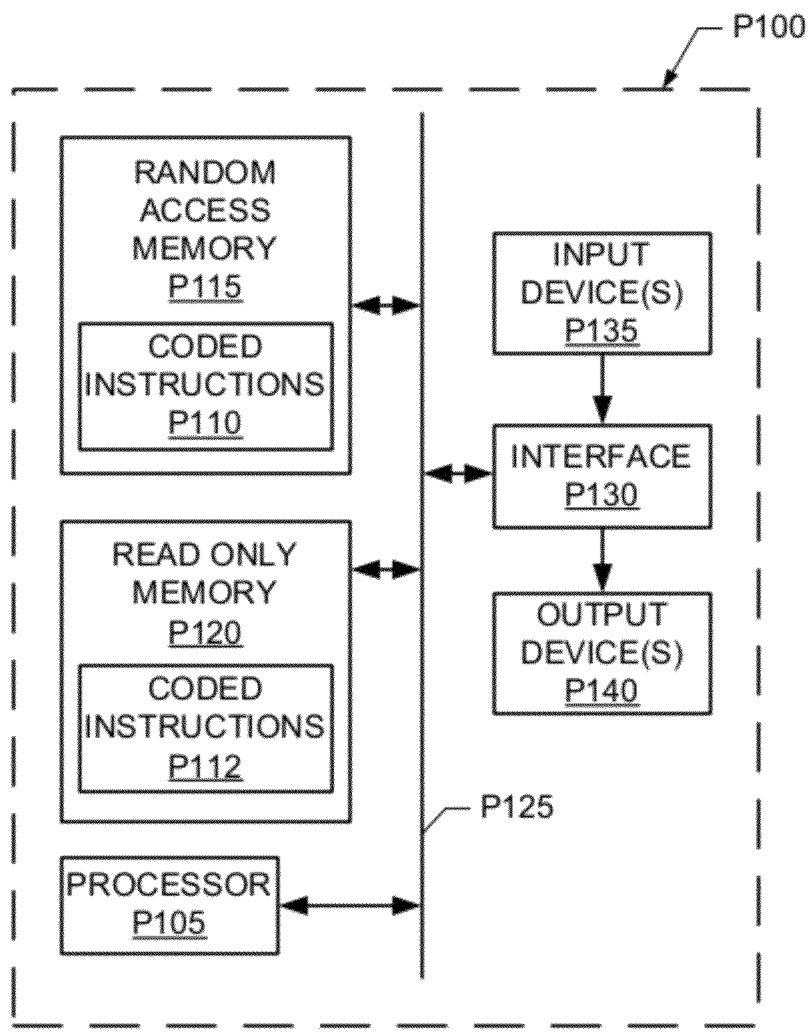
FIG. 11 is a schematic diagram of an example processor platform that may be used to implement the example systems, methods and apparatus described herein.

FIG. 11 is a schematic diagram of an example processor platform P100 capable of executing the instructions of FIGS. 7-10 to implement the example mobile broadband evaluator 102, the example remote application 150, the example remote analysis manager 202, the example log manager 204, the example analysis manager 302, the example remote application interface 304, the example file manager 306, the example IP address query engine 308, and/or the example broadband data card rule manager 310 of FIGS. 1-3. The processor platform P100 can be, for example, a server, a personal computer, a mobile phone (e.g., a cell phone), a personal digital assistant (PDA), an Internet appliance, or any other type of computing device.

The processor platform P100 of the example of FIG. 10 includes at least one general-purpose programmable processor P105. For example, the processor P105 can be implemented by one or more Intel® microprocessors from the Pentium® family, the Itanium® family or the XScale® family. Of course, other processors from other families are also appropriate. The processor P105 executes coded instructions P110 and/or P112 present in main memory of the processor P100 (for example, within a RAM P115 and/or a ROM P120). The processor P105 may be any type of processing unit, such as a processor core, a processor and/or a microcontroller. The processor P105 may execute, among other things, the example processes of FIGS. 7-10 to implement the example methods and apparatus described herein.

The processor P105 is in communication with the main memory (including a ROM P120 and/or the RAM P115) via a bus P125. The RAM P115 may be implemented by dynamic random access memory (DRAM), synchronous dynamic random access memory (SDRAM), and/or any other type of RAM device, and ROM may be implemented by flash memory and/or any other desired type of memory device. Access to the memory P115 and the memory P120 may be controlled by a memory controller (not shown). The memory P115 and the memory P120 may be implemented as mass storage devices for storing software and data. Examples of such mass storage devices include floppy disk drives, hard drive disks, compact disk drives and digital versatile disk (DVD) drives.

The coded instructions of FIGS. 7-10 may be stored in the memory P115 and the memory P120, in volatile memory, in non-volatile memory, and/or on a removable storage medium such as CD or DVD.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130. The input devices P135 permit a user to enter data and commands into the processor P105. The input device(s) can be implemented by, for example, a keyboard, a mouse, a touchscreen, a trackpad, a trackball, isopoint and/or a voice recognition system. The output devices P140 can be implemented, for example, by display devices (e.g., a liquid crystal display, a cathode ray tube display (CRT) a printer, etc.).

The interface circuit P130 also includes a communication device (e.g., network interface 312) such as a modem or network interface card to facilitate exchange of data with external computers via a network (e.g., an Ethernet connection, a digital subscriber line (DSL), a telephone line, coaxial cable, a cellular telephone system, etc.).

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method to identify mobile broadband Internet data card use of a computing device, the method comprising:

retrieving first information indicative of the computing device having a broadband data card and a network interface device (NID) capable of receiving Internet service;

retrieving second information indicative of a first Internet protocol (IP) address used by the computing device at a first time; and distinguishing between which one of the broadband data card or the NID is receiving the Internet service on the computing device by:

identifying that the broadband data card is responsible for receiving the Internet service when the first IP address is associated with a first broadband Internet service provider (ISP); and when identifying that the broadband data card is not responsible for receiving the Internet service, identifying that the NID is responsible for receiving the Internet service via a tethering adapter when the broadband data card is in an adapter list of the computing device having an unassociated IP status, and the first IP address is associated with a wireless telephone provider.

2. A method as described in claim 1, wherein the wireless telephone provider is the first broadband ISP.

3. A method as described in claim 1, further comprising identifying a candidate service class type based on the mobile broadband data card and the first broadband ISP.

4. A method as described in claim 3, wherein the candidate service class type comprises at least one of evolution data optimized (EVDO), high speed packet access (HSPA), high speed downlink packet access (HSDPA), high speed uplink packet access (HSUPA), global system for mobile communications (GSM), general packet radio service (GPRS), CDMA2000, 1xRTT, EDGE, and worldwide interoperability for microwave access (WiMAX).

5. A method as described in claim 1, wherein retrieving the first information indicative of the computing device having the broadband data card and the NID comprises invoking at least one of a network operation or a computer platform command.

6. A method as described in claim 5, wherein the network operation comprises an ipconfig command.

7. A method as described in claim 5, wherein the computer platform command comprises a systeminfo command.

8. A method as described in claim 1, further comprising identifying whether the first IP address is public or private.

9. A method as described in claim 8, further comprising invoking a trace route networking command when the IP address is private to identify an ISP associated with the private IP address.

10. A method as described in claim 1, further comprising:

retrieving third information indicative of a second IP address used at a second time;

identifying a second ISP associated with the second IP address; and confirming a traveling status of the mobile broadband data card based on a comparison of the first broadband ISP and the second ISP associated with the second IP address.

11. A method as described in claim 10, wherein the mobile broadband data card is identified as traveling when the first broadband ISP is different than the second ISP associated with the second IP address.

12. A method as described in claim 10, wherein the first broadband ISP and the second ISP associated with the second IP address are the same, and identifying an access router used during the first time and the second time to determine whether the mobile broadband data card is traveling.

13. A method as described in claim 12, further comprising identifying the mobile broadband data card as traveling when the access router used during the first time is different than the access router used at the second time.

14. An apparatus to identify mobile broadband Internet data card service use of a computing device, the apparatus comprising:
  an hardware processor;
  a remote application interface to retrieve first information indicative of the computing device having a mobile broadband card and a network interface device (NID) capable of receiving Internet service, and to retrieve second information indicative of a first Internet Protocol (IP) address used by the computing device at a first time; and
  a broadband data card rule manager to distinguish between which one of the mobile broadband data card or the NID is responsible for receiving Internet service on the computing device, the broadband data card rule manager to identify that the mobile broadband data card is responsible when the mobile broadband data card and the first IP address is associated with a first Internet Service Provider (ISP), and when the broadband data card rule manager identifies that the broadband data card is not responsible for receiving the Internet service, the broadband data card rule manager is to identify that the NID is responsible for receiving the Internet service via a tethering adapter when the broadband data card is an adapter list of the computing device having an unassociated IP status and the first IP address is associated with the wireless telephone adapter, at least one of the remote application interface or the broadband data card rule manager comprising a logic circuit.

15. An apparatus as described in claim 14, further comprising an analysis manager to identify wireless tethering when the broadband data card rule manager identifies nomenclature indicative of tethering associated with a second adapter and the IP address query engine identifies a wireless service provider associated with the second adapter.

16. An apparatus as described in claim 14, wherein the remote application interface is to receive third information indicative of a second IP address used at a second time, and an analysis manager is to identify an instance of traveling with the mobile broadband data card when the first ISP is different from a second ISP associated with the second IP address.

17. A machine readable storage device or storage disk comprising instructions stored thereon that, when executed, cause a machine to, at least:
  retrieve first information indicative of a computing device having a broadband data card and a network interface device (NID) capable of receiving Internet service;
  retrieve second information indicative of a first Internet protocol (IP) address used by the computing device at a first time; and
  distinguish between which one of the broadband data card or the NID is receiving the Internet service on the computing device by:
    identifying that the broadband data card is responsible for receiving the Internet service when the first IP address is associated with a first broadband Internet service provider (ISP); and
    when identifying that the broadband data card is not responsible for receiving the Internet service, identifying that the NID is responsible for receiving the Internet service via a tethering adapter when the broadband data card is in an adapter list of the computing device having an unassociated IP status, and the first IP address is associated with a wireless telephone provider.

18. A machine readable storage device or storage disk as described in claim 17 having instructions stored thereon that, when executed, cause a machine to identify a candidate service class type based on the mobile broadband data card and the first broadband ISP.

19. A machine readable storage device or storage disk as described in claim 17 having instructions stored thereon that, when executed, cause a machine to invoke at least one of a network operation or a computer platform command.

20. A machine readable storage device or storage disk as described in claim 19 having instructions stored thereon that, when executed, cause a machine to invoke at least one of an ipconfig command, a systeminfo command, or a trace route command.

21. A machine readable storage device or storage disk as described in claim 17 having instructions stored thereon that, when executed, cause a machine to identify whether the first IP address is public or private.

22. A machine readable storage device or storage disk as described in claim 17 having instructions stored thereon that, when executed, cause a machine to:
  retrieve third information indicative of a second IP address used at a second time;
  identify a second ISP associated with the second IP address; and
  confirm a traveling status of the mobile broadband data card based on a comparison of the first broadband ISP and the second ISP associated with the second IP address.

23. A machine readable storage device or storage disk as described in claim 22 having instructions stored thereon that, when executed, cause a machine to identify the mobile broadband data card as traveling when the first broadband ISP is different than the second ISP associated with the second IP address.

* * * * *